July 11, 1961
G. A. M. PETERSEN ET AL
2,991,977
BULL WHEEL CABLE PULLER
Filed April 23, 1957
3 Sheets-Sheet 1
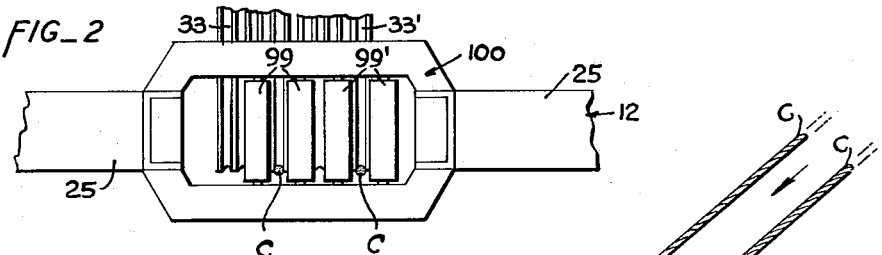
FIG_2
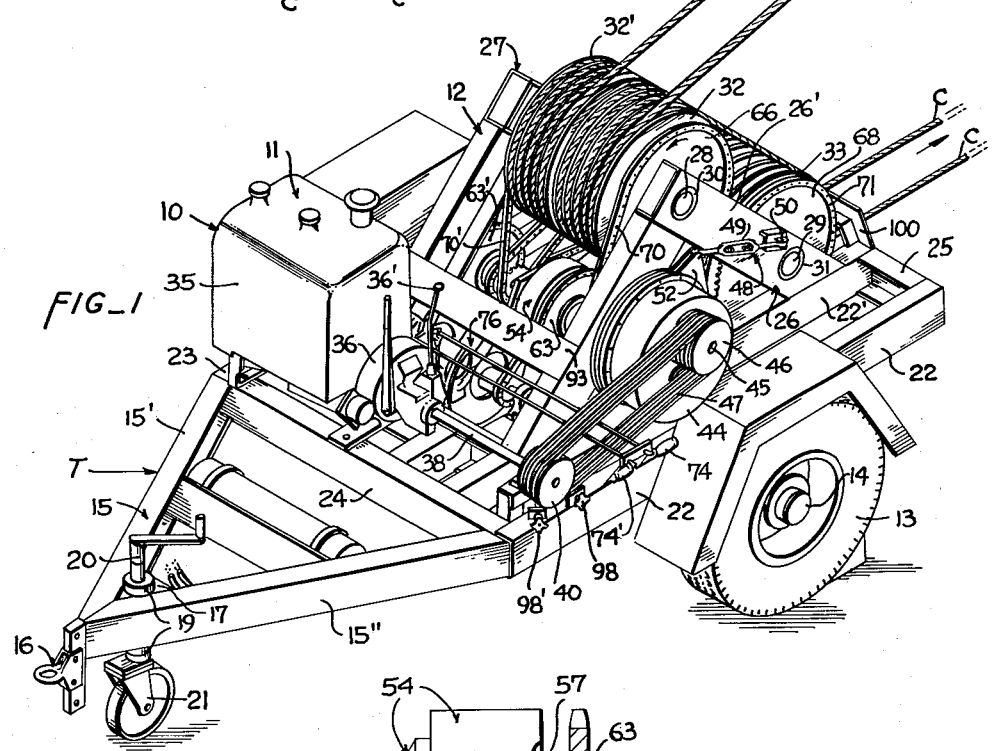
FIG_1
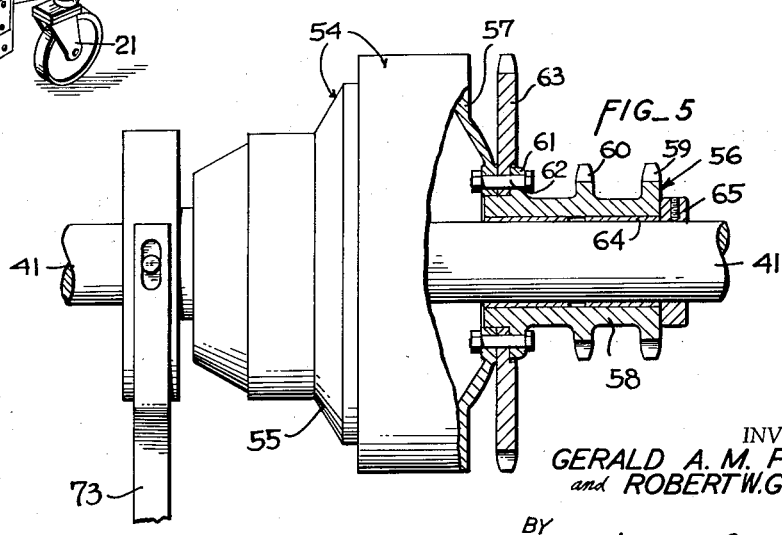
FIG_5
INVENTORS
GERALD A. M. PETERSEN
and ROBERT W. GOODE
BY
Hansen and Lane
THEIR ATTORNEYS

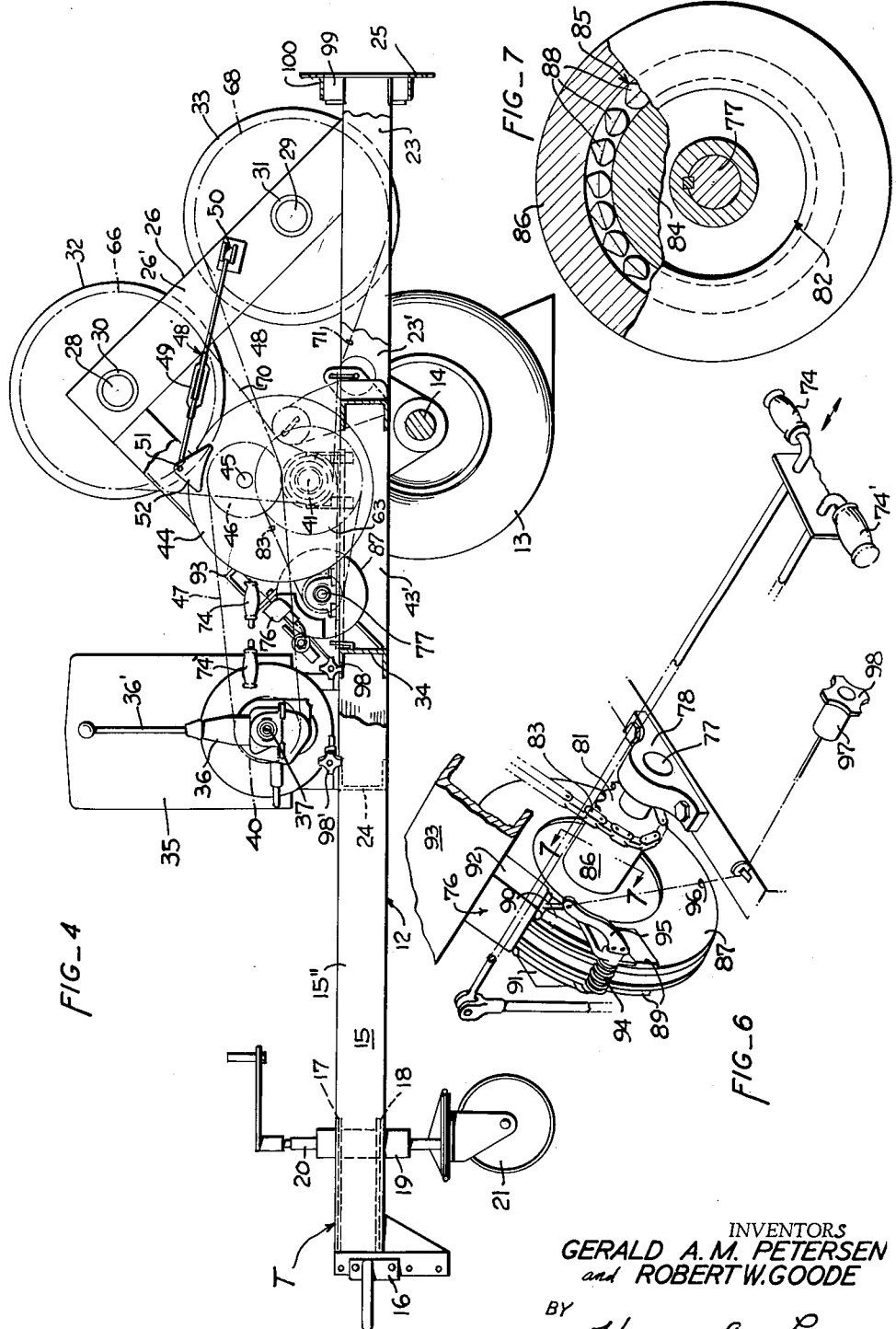

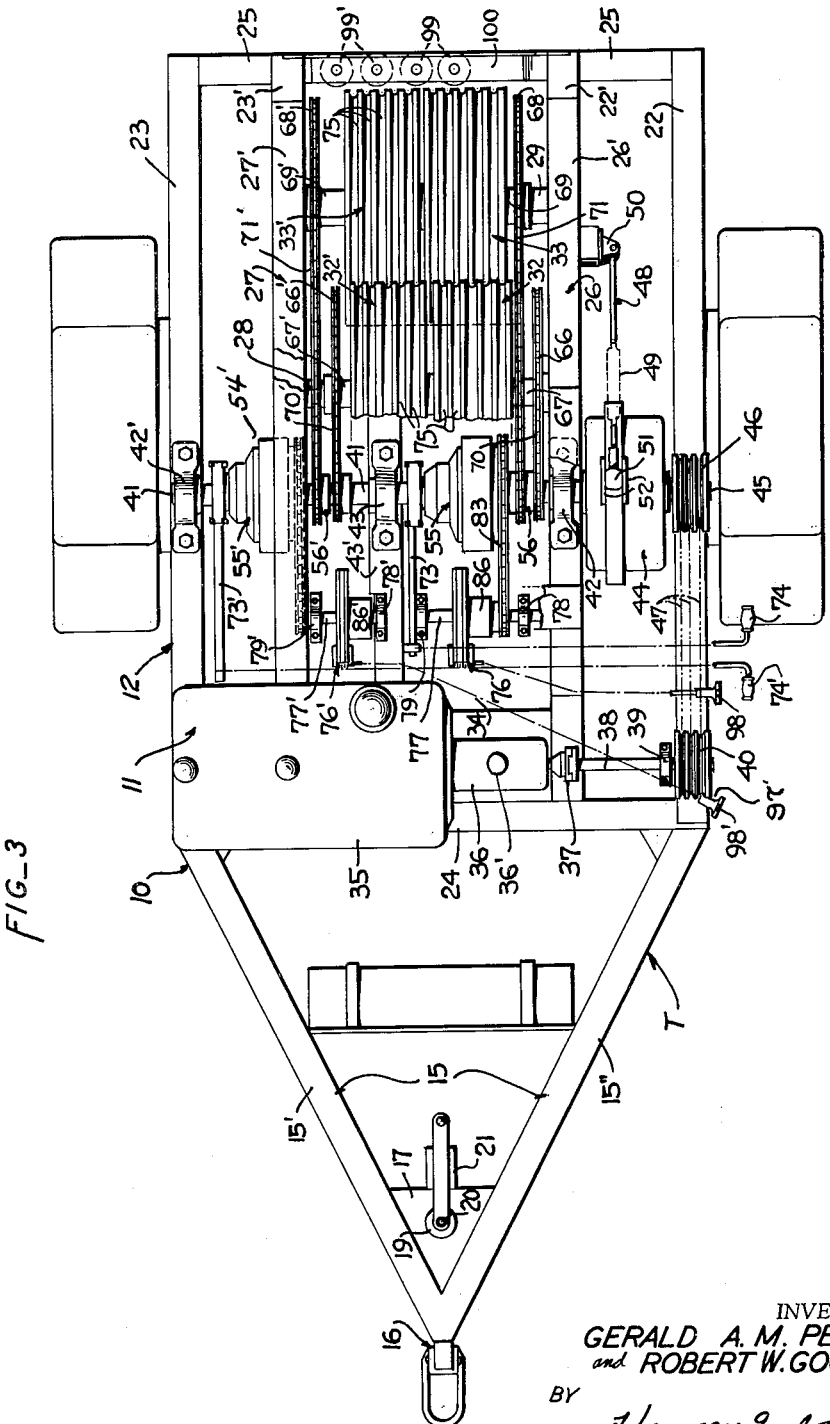

United States Patent Office 2,991,977
Patented July 11, 1961

2,991,977
BULL WHEEL CABLE PULLER
Gerald A. M. Petersen, 460 Kifer Road, Santa Clara, Calif., and Robert W. Goode, Morgan Hill, Calif.; said Goode assignor to said Petersen
Filed Apr. 23, 1957, Ser. No. 654,542
4 Claims. (Cl. 254—175.7)

This invention relates to wire or cable pulling equipment and more particularly to equipment of the type used in connection with maintenance and re-conductoring of present power lines.

The term "reconductoring" as used in this application is concerned with the removal of present or existing cable or wire in such a manner that the wire or cable may be salvaged in a simple yet effective manner. That is to say, the cable or wire is rewound onto reels with a minimum of abrasion, spoilage, kinking or other deformities so that such cable or wire may again be used. Reconductoring of power lines has become necessary in many areas throughout the world due to the growth of new industries and increase of population to the extent that anticipated capacities of existing power lines are no longer capable of carrying the required power loads. As a result of these changes of circumstances, power companies and public utilities find that existing cables and wire which may still be usable have to be torn down. Due to the present value and scarcity of the materials from which such cables and wires are made, it becomes of utmost importance that they be salvaged for reuse in other localities.

In addition to the foregoing, with present wage standards, reconductoring operations, if the job is to be accomplished with a minimum number of man hours and a minimum rigging of ancillary equipment, must be done with most efficient, safe and effective equipment. Such is the nature of the cable puller contemplated by the present invention, that is to say, wire can be taken in without the need of intermediate supports for the cable or wire between poles or power towers to effect a salvaging of the existing cables or lines with a minimum of time and in an economical fashion.

The apparatus of the present invention contemplates a cable or wire puller so constructed and arranged to facilitate pulling in existing lines or cables and for simultaneously paying out such lines or cables to reels or spools on which the lines and cables are wound for temporary storage incident to re-use in other locations.

Moreover, the present pulling equipment is so constructed and arranged as to pull-in great lengths of this wire or cable so that a minimum number of splices or couplings are required in the future reconstruction of power lines with them.

It is one object of this invention to provide a cable or wire puller so constructed as to attain a maximum amount of frictional gripping of the wire or cable within a minimum of space requirement so that little or no slippage will occur and so that at all times sufficient tension on the wire or cables will be obtained to avoid kinking, sagging or looseness of the cable or wire which would tend to damage the same preliminary to reeling thereof onto reels as aforesaid.

The foregoing object further contemplates the provision of a cable or wire puller which may be tended by one man only.

A further object of this invention is to provide such a cable or wire puller as to pull the cable or wire at a very slow speed, but with a sufficient amount of power, well above normal safety factors, as to assure proper tension of the wire during pulling-in thereof to avoid its drooping or sagging over existing power lines, roadways, orchards, vineyards and other valuable installations which might be damaged. Damage to existing property can and often does create costs to the power companies in excess of the normal cost of the reconductoring operation. The present apparatus has as one of its objects to relieve such damage, minimize the same, and even eliminate extra costs as above stated.

In this connection it should be understood that the existing wires or cables are first disconnected from the insulators on the cross arms of the power poles bearing them and the cable cut some several thousand feet away from the point of installation of the equipment. The cut cable is then tied on to a rope or cable extending up from a tensioning device by which the cable is maintained relatively tensed so as not to sag or hang down unduly during the pulling in operation.

The opposite end of the cable or wire is then connected by a come-along to an initial strand of wire or cable already cinched around the bull wheels of the cable pulling equipment so that the cable or wire can be immediately drawn from pole to pole over the bull wheels of the cable puller and paid out therefrom to the rewind wheels stationed opposite the cable puller. It will therefore be appreciated that it is imperative that this cable being pulled in at all times be kept at proper tension.

These and other objects and advantages of the present invention will become apparent in the following description when read in the light of the drawings in which:

FIG. 1 is a perspective view of the cable pulling apparatus embodying the present invention.

FIG. 2 is a fragment of an end elevational view of FIG. 1 as seen from the rear thereof.

FIG. 3 is a plan view of the apparatus shown in FIG. 1 with parts thereof broken away for purposes of illustration.

FIG. 4 is a side elevation partially broken away and sectionalized to more clearly illustrate the apparatus of FIG. 1.

FIG. 5 is an enlarged fragmentary detail of a clutch and drive unit embodied in the apparatus of FIGS. 1, 3 and 4.

FIG. 6 is a fragmentary perspective view of a portion of the apparatus of FIGS. 1, 3 and 4.

FIG. 7 is a fragmentary section through FIG. 6 as seen along line 7—7 thereof.

Referring to FIGS. 1, 3 and 4, the cable pulling equipment, generally indicated 10, comprises a self-contained unit 11 mounted on a frame 12 providing a rigid base for components embodied in the unit so that the entire unit can be moved about and placed as desired or wherever necessary. In the present disclosure we have shown the unit 10 consisting of a frame 12 which is so constructed as to become the chassis of a trailer T supported on wheels 13 mounted on an axle 14 suitably secured to the under side of the frame 12 in any conventional manner.

The fore end of the frame 12 terminates in a pair of diagonal members 15 extending from side channels 15' and 15" and joined at an apex. A trailer hitch unit 16 is welded to the apex of the diagonal member 15. These diagonal frame members 15 are strengthened at their apex ends by upper and lower webs 17—18 through which a sleeve boss 19 extends in a vertical direction. The boss 19 is threaded to receive the threaded shank 20 of a dolly member 21 by which the fore end of the frame 12 may be supported in a level condition relative to the rear axle 14.

As best seen in FIG. 4, the cable pulling unit 10 is balanced over the rear axle 14 of the trailer T so that the latter and the wheels 13 carry the load.

The frame member 12 consists of a pair of side channels 22—23 joined to each other by fore and aft channel members 24—25 to provide a rigid frame. Spaced inwardly from each of the side channels 22—23 are parallel intermediate channels 22'—23' respectively. These intermediate channels each support an A-frame 26 and 27, respectively, having their apexes directly above the axle member 14, previously mentioned. These A-frames 26—27 are joined by transverse shafts 28—29, the ends of which are journaled in suitable bearings 30—31 provided on the opposing back arm 26'—27' of the A-frames 26 and 27, respectively.

Rotatably mounted on these shafts 28 and 29 are two pairs of bull wheels 32—33, 32'—33'. These bull wheels being on the back diagonal arms 26'—27' of the A-frames are disposed in the rearmost area of the frame in alignment with each other along a line parallel to the back arms as shown in FIGS. 1, 3 and 4.

Just inwardly or rearwardly of the forward channel member 24 and spaced therefrom is an intermediate fore-channel member 34 which extends between the intermediate side members 22'—23' as best illustrated in FIG. 3. A self-contained power unit in the form of an internal combustion engine 35 is mounted on the fore end of the frame in the area just above the cross channels 24 and 34 in that area of the main frame 12.

The crank shaft of the internal combustion engine 35 extends transversely of the frame 12, that is, parallel to the axle 14 of the trailer member T upon which the frame is mounted. The engine 35 itself occupies the right side only of the support afforded by cross channels 24 and 34. A transmission housing 36 extends to the left of the engine and is provided with a universal joint or coupling 37 just above intermediate channel 22'. A drive shaft 38 extends from coupling 37 through a bearing 39 mounted on side channel 22. A multi-grooved sheave 40 is secured to the end of drive shaft 38 extending beyond the bearing 39 just above side channel 22 of frame 12.

A driven shaft 41 is journaled for free turning movement in end bearings 42—42' and intermediate bearing 43. The end bearings 42—42' are mounted on the fore to aft channels 22' and 23, respectively, as best seen in FIG. 3. The intermediate bearing 43 is mounted on intermediate channel 43'. This driven shaft 41 extends transversely of the frame 12, parallel to the bull wheel shafts 28 and 29 as well as the drive and crank shaft of the engine 35.

The driven shaft 41 extends to the left of the intermediate channel 22' to receive and support a gear reduction unit 44. This gear reduction unit which is of any well known design embodies a train of gears (not shown) one of which is secured to the driven shaft 41 within the housing of the gear reduction unit to take-off power from the train of gears therein. A semi-drive stud 45 extends from that side (left) of the gear reduction unit which is opposite to the side (right) of entrance of the driven shaft 41 into the same. This semi-drive stud 45 has a multi-grooved sheave 46 keyed or otherwise secured thereto above the side channel 22 of frame 12. The grooves of sheave 46 are aligned with those of sheave 40 on drive shaft 38. A plurality of V-belts 47 are trained around these two grooved sheaves 40 and 46 and serve to drivingly connect them together.

It should here be noted that the driven shaft 41 carrying the gear reduction unit 44 enters the same eccentric to the axis of the semi-drive stud 45. In this manner the gear reduction unit is rockable about the axis of driven shaft 41 to effect movement of the semi-drive stud 45 in fore to aft direction, i.e., toward and from the drive shaft 38. A tensioning device 48 in the form of a turnbuckle 49 controls the fore to aft movement or rocking of the gear reduction unit 44 relative to the frame 12. This turnbuckle has one end anchored as at 50 to the rear arm 26' of the A frame 26 and its opposite end pivotally secured as at 51 to a bracket plate 52 secured to the housing of the gear reduction unit 44. By this arrangement the upper zone of the gear reduction unit including the semi-drive stud 45 and sheave 46 can be moved forward to release tension on the belts 47. Conversely the sheave 46 can be drawn rearwardly to stretch these belts tightly between the two sheaves 40 and 46 so that the belts frictionally engage in their respective grooves in these two sheaves.

From the foregoing it will be appreciated that the driven shaft 41 is constantly turned when the engine 35 is in operation. It should here be noted that power from the engine 35 to the driven shaft 41 is controlled by the transmission 36 which is the conventional three speed forward and one speed reverse type under the control of a gear shift lever 36'. By this arrangement the power to the drive shaft 38 and sheave 40 can be geared down or speeded up as desired. Moreover, the sheave 46 being of slightly greater diameter than the sheave 40 greater power is transmitted to the gear reduction unit 44. The transmission of power from the semi-drive stud 45 to driven shaft 41 is geared down considerably to obtain a maximum of power at a greatly reduced speed.

Referring now to FIG. 3 it will be noted that there are two clutches 55 and 55' mounted on the driven shaft 41. These clutches are each operatively associated with a set of drive sprockets 56 and 56', respectively, also mounted on the driven shaft 41. Both of these clutches and their drive sprockets are identical units 54 and 54' one of which is depicted in enlarged detail, FIG. 5.

In the arrangement shown in FIG. 5 the clutch 55 is keyed to driven shaft 41 so as to turn therewith in the conventional manner when power is transmitted thereto. This clutch 55 includes a disc or the like (not shown) adapted to drivingly, i.e., frictionally, engage a housing 57 secured to and formed as a part of the drive sprocket portion 56. The sprocket arrangement as best seen in FIG. 5 comprises a sleeve portion 58 having a pair of small sprockets 59 and 60 formed integrally therewith. This sleeve portion 58 has an annular flange 61 secured by bolts 62 to the housing 57. These same bolts secure a larger sprocket 63 to the sleeve portion as well as the housing 57. A bushing 64 is disposed within the hollow core of the sleeve 58 so as to ride freely upon the driven shaft 41. A collar 65 secured to the shaft 41 maintains the sprocket portion 56 in place upon the shaft and keeps the housing 57 in operative relation to the friction disc within the clutch member 55.

As best seen in FIG. 3, the two small sprockets 59 and 60 are drivingly connected to a respective set of bull wheels 32—33 and 32'—33'. The small sprockets on the clutch unit 55 are drivingly related to the bull wheels 32—33 on the left side of the frame 12. The small sprockets on the clutch unit 55' are drivingly related to the bull wheels 32'—33' on the right side of the frame 12. To this end a large sprocket 66 is secured to a hub 67 extending from the bull wheel 32. A large sprocket 68 is secured to a hub 69 extending from the bull wheel 33.

A similar arrangement on the other side of the frame 12 includes a large sprocket 66' secured to a hub 67' extending from the bull wheel 32' and a large sprocket 68' secured to a hub 69' extending from the bull wheel 33'. The sprocket 66 is drivingly connected to the small sprocket 59 by a chain 70 and the sprocket 68 is drivingly connected to the small sprocket 60 by a chain 71 on the left side of the frame 12. Chains 70' and 71' connect the sprockets 66' and 68' respectively to the two small sprockets on the drive sprocket arrangement 56' of the clutch unit 55' on the right side of the frame 12.

Each clutch unit 55 and 55' has a manually controlled lever 73 and 73' respectively associated therewith. The lever 73 is connected to a handle 74 accessible on the left side of the frame 12 and lever 73' is likewise connected to a handle 74' so that an attendant can manipulate one or both of these handles to cause their respective clutches 55 and 55' to drive the corresponding sprocket units 56 and 56'. In this manner one or both sets of bull wheels are caused to turn upon their respective shafts 28 and 29 through driving connection with the common drive shaft 41.

As best seen in FIG. 1, each set of bull wheels 32—33 and 32'—33' turn in the direction of the arrow on wheel 32. These bull wheels are each grooved as at 75 and the grooves of the upper bull wheel 32 or 32' are offset relative to the grooves of the lower bull wheel 33—33'. The cable or wire C to be drawn in off existing power poles enter the first (left hand groove 75) of a respective set of bull wheels. The cable is trained around this set of bull wheels the desired number of wraps in order to obtain full frictional contact between the surface of the cable and the face of the several grooves 75. These grooves are lined with neoprene rubber as clearly shown and described in the copending U.S. application of Gerald A. M. Petersen, Serial No. 590,070, filed June 7, 1956, now Patent No. 2,954,702. With the grooves thus lined all possibility of scraping, marring, scratching or abrading of the surface of the cable C is eliminated. This is very important because any of such irregularities on the surface of the cable causes corona loss along the same when an electrical power load is transmitted over the cable. Thus it will be appreciated that no damage can occur to the surface of cable or wire as it is being drawn in by the bull wheels of the present invention.

Since the cable C being pulled becomes tensed it will be apreciated that should any snags occur along the line at any power pole it sometimes becomes necessary to slacken up on the pull against the cable. In other cases should the engine stall or stop operating for any reason, obviously there would be a back pull on the cable C. To this end braking means 76 is provided to deter reverse action or rotation of the bull wheels under the influence of the tensed cable.

The braking means 76 and 76' are operatively associated with the driven shaft 41. Each braking means 76, 76' include respectively an auxiliary shaft 77 and 77', one for each set of bull wheels 32—33 and 32'—33', respectively. As best seen in FIG. 3, each braking means has its shaft journalled in bearings 78—79 and 78'—79' mounted on a cross beam of the frame 12. This cross beam is ahead of the driven shaft 41 and between the latter and the engine 35. The two auxiliary shafts 77 and 77' are in axial alignment and each is ahead of the respective clutch 55—55' with which it is to be associated. The two braking means 76 and 76' being identical, like reference numerals are applied to like parts, those on the left side of the frame being plain numerals while those on the right side of the frame are the same numerals with prime exponents.

Referring now to FIGS. 3, 4, 6 and 7, each brake means comprises a sprocket 81 having its hub portion 82 keyed to the auxiliary shaft 77 for turning the same. The sprocket 81 is connected by a chain 83 to the large sprocket 63 secured to the housing 57 of the clutch means 55. It is not so important that the brake means be connected to the clutch. It is most important that the brake means be in direct control with the bull wheels which are under the influence of the tensed cable. Consequently it will be noted that the drive chains 70 and 71 between the bull wheels 32—33 and the small sprockets 59 and 60 are drivingly connected to the sleeve portion 58 of the clutch means as is the larger sprocket 63 connected by the chain 83 drivingly connected to the sprocket 81 of the brake means. Therefore it will be apparent that turning of the bull wheels in either direction will likewise cause the sprocket 81, hub 82 and auxiliary shaft 77 to turn in a similar direction.

The hub portion 82 of sprocket 81 forms the inner race 84 of a one-way connector means 85 or back-stop as it is called in the trade. The outer race 86 of this connector means 85 is formed as a part of a brake disc 87. The outer race 86 does not fit tightly upon the inner race 84 but rather sides upon a plurality of cam rollers 88 disposed in annular array between the two race members 84 and 85. Thus the brake disc 87 is maintained concentric to the auxiliary shaft 77. The arrangement in such that the sprocket 81 is free to turn counterclockwise (FIG. 6) even though the brake disc 87 is held secure (stationary) between the brake shoes 89. However, should the power fail or the clutches 55—55' become disengaged the weight of the cables C between power poles would pull heavily upon the bull wheels and tend to cause the latter to turn clockwise FIG. 4. Thus too the chain drive 83 or 83' from the sprocket side of the clutch 55 or 55' would cause the sprockets 81 or 81' to reverse or turn clockwise FIG. 6 whereupon the inner race 84 rocks the cam rollers 88 into binding engagement with the outer race 86 to thereby also tend to turn the brake disc 87 clockwise. However, since the brake shoes 89 are constantly locked in braking condition against the disc 87 the latter cannot turn with the result that reverse (free) turning of the bull wheels is thereby deterred.

The brake disc 87 would normally turn freely in either direction about the axis of the auxiliary shaft 77. However, a pair of brake shoes 89 are provided to embrace the disc 87, i.e., at least a good segmental portion thereof as best seen in FIG. 6. These brake shoes are joined for united movement toward or from the disc 87 by a pair of coacting levers 90 and 91. These levers are pivotally connected to a mounting block 92 which is secured to a cross beam 93 extending between the forward arms of the A frames 26 and 27. The levers 90 and 91 and the brake shoes attached thereto are normally urged away from each other by a compression spring 94 and are disposed to be compressed toward each other by a cam lever 95. The lever 95 is connected by a wire or cable 96 to a screw shank 97 mounted on the side channel 26 of the frame 12. There are two such screw shanks 97 and 97' mounted on the channel 26, the screw shank 97' being connected by a cable 96' to the cam lever 95' controlling the brake means 76 on the right hand side of the frame 12.

Each screw shank 97 and 97' is connected to a knob or handle 98 and 98', respectively, and these knobs are accessible to the attendant at a zone where he has control of the two clutch operating handles 74 and 74' previously mentioned.

By this arrangement it will be seen that the cable C wound around one set of bull wheels 32—33 or 32'—33' as the case may be can now be drawn toward the pulling equipment 10 and payed out rearwardly thereof as indicated by the arrows in FIG. 1. The cable payed out passes between a set of vertical rolls 99 and 99', respectively, so that the cable will not be pulled out of the last groove 75 of the lowermost bull wheel 33 or 33' as the case may be. These sets of rolls 99 and 99' are journalled in a box frame 100 formed in the back channel member 25 of the frame 12 as best seen in FIG. 2.

The cable thus paid out is coiled onto a reel (not shown) arranged nearby so that the cable can be stored and held for future use. With the engine 35 running at normal r.p.m. the speed of the drive shaft 38 is controlled by the transmission 36 under control of the manually operated gear shaft lever 36'. The speed of rotation between the sheave 40 and the sheave 46 is cut down somewhat by the increased diameter of the latter. Now then, the gear reduction unit 44 cuts down this speed considerably so as to attain greater power in the turning of the driven shaft 41. This speed may be as low as 100 to 125 r.p.m. as distinguished from the relatively greater number r.p.m.'s at which the crank shaft of the engine 35 is turning.

The driven shaft 41 is constantly turning but no power is transmitted therefrom to either set of bull wheels 32—33 or 32'—33' so long as the clutches 55 and 55' are disengaged from their respective sprocket sleeves 58 and 58'. These sleeves, as previously stated, are mounted upon the driven shaft 41 for free rotation relative thereto and are drivingly connected to their respective bull wheels by drive chains. Consequently should any reverse pull be exerted on the incoming (upper) strand of cable C the bull wheels about which such cable is trained would be free to turn. This freedom of turning of each set of bull wheels is resisted by the braking means 76—76'. It should here be noted that each set of bull wheels has a separate and independent braking means, the brake means 76 being on a shaft 77 which is separated from the shaft 77' of the brake means 76'.

From the foregoing it will be noted that by application of pressure of the brake shoes 89 to the brake disc 87 of either brake means 76 or 76' reverse turning of each set of bull wheels 32—33 or 32'—33' under the influence of the incoming cable C is resisted. To this end it will be appreciated that the present equipment can also serve as a tensioning device. That is to say, if the cable C (upper strand) is being pulled away from the equipment 10, the brake means thereof can be operated in such a manner as to keep such cable under proper tension so that it will not sag or cause the bull wheels to overrun beyond normal tensioning speed.

With the above arrangement one attendant has full control of the cable pulling equipment 10 of the present invention once it is set up for operation. As already mentioned the cable to be pulled in must first be disconnected from the power pole, one end of such cable C being connected to a strand of starting cable or rope already wound about two bull wheels 32—33 constituting one set thereof. The opposite end of the cable or wire to be pulled in must then be connected to another line or rope having its opposite end connected to a tensioning apparatus which may be a rig such as the one herein described, set up at the other end of the line. When thus set up the other rig becomes a tensioning device in which the brake means is set to slip a little, yet maintain the cable tensed between the bull wheels of the tensioning device and the pulling equipment at the opposite end of the cable being reclaimed.

During the pulling in of cable or wire by the present equipment 10 it becomes necessary to secure the brakes 76 and 76' so that the brake discs 87 are firmly fixed relative to the frame 12. Note now that when the clutch 55 is engaged to turn its sprocket sleeve 58 the latter begins to turn with the driven shaft 41 and via small sprockets 59—60, their chains 70 and 71 and the sprockets 66 and 68, the bull wheels 32 and 33 are positively driven, i.e., turned, in a direction to pull in on the cable C. Now even though the braking means 76 associated with such sprocket sleeve 58 is set tight this will not deter turning of the same in the pulling in direction as stated because of the one-way connector means 85 on the brake means 76. This one way connector 85 allows free turning of the sleeve shaft 58 and all units connected thereto in driving direction only. However, if the engine is stopped, or if the clutch 55 is disengaged so that the sleeve shaft is free to turn relative to the driven shaft 41 the several cam rollers 88 in the one way connector 85 rock into binding relation with the outer roll 86 thereof which is a part of the brake disc 87. This brake disc 87 being firmly gripped between its brake shoes, cannot turn and consequently no reverse turning of the bull wheels can occur until the braking means is released.

While we have described our new pulling equipment in specific detail it will be appreciated by those skilled in the art that it is susceptible to modification, variation and/or alteration without departing from the spirit of our invention. We, therefore, desire to avail ourselves of all modifications, variations, and/or alterations as fairly come within the purview of the appended claims.

What we claim as new and desire to protect by Letters Patent is:

1. In a cable pulling device of the type including a pair of bull wheels adapted to have a cable wound about them for frictionally engaging the same and a source of power for driving said bull wheels in one direction for pulling in said cable; means for maintaining said cable under tension independently of the driving connection between said bull wheels and said source of power, comprising an auxiliary shaft, sprocket means for drivingly connecting said bull wheels to said auxiliary shaft, a brake disc freely rotatable on said auxiliary shaft, brake shoes manually operated to engage said brake disc, and a one way coupling connection between said sprocket means and brake disc comprising an inner race on said auxiliary shaft secured to said sprocket means, a hub secured to said brake disc circumscribing said inner race, and a plurality of cam rollers between said hub and inner race affording free turning of said sprocket means relative to said brake disc when said bull wheels are turned by said source of power and for connecting said sprocket means and the bull wheels to said brake disc when said bull wheels are turned in an opposite direction by a reverse pull on the cable wound about them.

2. In a cable pulling device of the type including a set of bull wheels adapted to have a cable wound about them for frictionally engaging the same and a source of power including a driven shaft having a clutch connection with sprocket means drivingly connected to said set of bull wheels for driving the same in one direction to pull said cable between power poles; a one way connector for maintaining said cable under tension between said power poles in the event of failure of said source of power or said clutch connection comprising an auxiliary shaft journaled for rotation parallel to said driven shaft, a sprocket keyed to said auxiliary shaft drivingly connected to the sprocket means on said driven shaft and having a hub portion providing an inner race for said one way connector, a brake disc having a hub portion providing an outer race for said one way connector, brake shoes adapted to have bearing engagement with said brake disc for deterring turning thereof with said auxiliary shaft, and a plurality of cam rollers between said inner and outer races affording free turning of said sprocket under the influence of said sprocket means when the latter is driven by said driven shaft and for connecting said sprocket to said brake disc when said driven shaft is turned in an opposite direction under the influence of the pull created by said cable strung between said power poles.

3. In cable pulling equipment of the type including a set of sprocketed bull wheels having a cable wound about them for frictionally engaging the same and a driven shaft connected to a source of power, clutch means on said driven shaft, a sprocket sleeve free to turn on said driven shaft adjacent said clutch means, said sprocket sleeve having a clutch disc connected thereto adapted to be drivingly connected to said driven shaft upon manual operation of said clutch means, and chain means drivingly connecting said sprocket sleeve to the sprocket connected to each of said bull wheels for turning the latter in one direction; a one way brake means for such arrangement comprising an auxiliary shaft journaled parallel to said driven shaft, a brake disc arranged upon said auxiliary shaft, manually operable brake means for frictionally engaging said brake disc, a sprocket keys to said auxiliary shaft, a hub portion connected to said auxiliary shaft, a sleeve connected to said brake disc circumscribing said hub portion, and a plurality of one roller cams interposed between said hub portion and said sleeve connected to said brake disc for deterring turning of said sprocket, sprocket sleeve and said set of bull wheels under the influence of said tensioned cable when said clutch means disconnects said sprocket sleeve from said driven shaft.

4. In a cable pulling device of the type including a set of bull wheels adapted to have a cable wound about them for pulling the cable over the spans between several power poles under power from a source of power connected to a drive shaft having a sprocket sleeve freely rotatable thereon adapted to be drivingly connected to said drive shaft via a clutch, each said bull wheel having a sprocket secured thereto concentric therewith, said sprocket sleeve having two small and one large sprocket thereon, and chain means drivingly connecting each small sprocket on said sprocket sleeve to a respective one of the sprockets on said set of bull wheels whereto to drive said bull wheels when said clutch is engaged with said sprocket sleeve; a one way braking mechanism for retarding backward turning of said bull wheels in the event of power or clutch failure comprising an auxiliary shaft parallel to said drive shaft, a brake disc freely rotatable on said auxiliary shaft, brake shoes normally gripping said brake disc for retarding turning thereof, a sprocket secured to said auxiliary shaft, a drive chain drivingly connecting said sprocket to the large sprocket on said sprocket sleeve for turning said auxiliary shaft in unison therewith, a hub on said sprocket providing the inner race for a one way connector, an outer race for said one way connector formed as a part of said brake disc and surrounding the inner race provided by said hub, and a plurality of cam rollers between said inner and outer races facilitating free turning of said inner race unidirectional with said sprocket when said drive shaft is driven by said source of power and for positively engaging said outer race for retarding backward turning of said sprocket and sprocket sleeve under the influence of said bull wheels when the weight of the cable spanning between power poles tends to turn them in a reverse direction.

References Cited in the file of this patent

UNITED STATES PATENTS

| | | |
|---|---|---|
| 384,626 | Hilleary et al. | June 19, 1888 |
| 980,220 | Eastman | Jan. 3, 1911 |
| 1,060,165 | Cole | Apr. 29, 1913 |
| 1,071,882 | Cole | Sept. 2, 1913 |
| 1,542,040 | De Lavaud | June 16, 1925 |
| 1,575,142 | Wilson et al. | Mar. 2, 1926 |
| 1,661,275 | Stensland | Mar. 6, 1928 |
| 1,680,843 | Bechaud | Aug. 14, 1928 |
| 2,250,269 | Lockwood | July 22, 1941 |
| 2,397,186 | Lill | Mar. 26, 1946 |
| 2,647,699 | Bush | Aug. 4, 1953 |
| 2,705,599 | McCullough | Apr. 5, 1955 |
| 2,766,851 | Driehaus | Oct. 16, 1956 |